United States Patent
Mozer et al.

(10) Patent No.: US 8,134,431 B2
(45) Date of Patent: Mar. 13, 2012

(54) SWITCH, IN PARTICULAR VEHICLE SWITCH, EVALUATION UNIT THEREFOR AND ASSOCIATED SWITCH UNIT

(75) Inventors: Reiner Mozer, Vaihingen/Enz (DE); Daniel Horst, Bietigheim-Bissingen (DE); Conny Hein, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 682 days.

(21) Appl. No.: 12/224,845

(22) PCT Filed: Mar. 9, 2007

(86) PCT No.: PCT/EP2007/002046
§ 371 (c)(1),
(2), (4) Date: Sep. 8, 2008

(87) PCT Pub. No.: WO2007/104480
PCT Pub. Date: Sep. 20, 2007

(65) Prior Publication Data
US 2009/0128267 A1 May 21, 2009

(30) Foreign Application Priority Data
Mar. 13, 2006 (DE) .......... 10 2006 012 890

(51) Int. Cl.
*H01H 9/00* (2006.01)
*G01B 7/14* (2006.01)
*G01B 7/30* (2006.01)

(52) U.S. Cl. ........ 335/207; 335/177; 335/205; 335/206; 335/302; 324/207.2; 324/207.22; 324/207.25

(58) Field of Classification Search .......... 335/151–153, 335/167–184, 205–207, 302; 324/207.4, 324/207.2, 207.22, 207.21, 207.24, 207.25, 235, 251, 252; 340/825.07, 825.06, 825.52, 340/825.31, 825.34, 825.22, 825.57, 825.62, 340/825.65, 870.01

See application file for complete search history.

(56) References Cited

U.S. PATENT DOCUMENTS

| | | | | | |
|---|---|---|---|---|---|
| 3,277,413 | A | * | 10/1966 | Kropp et al. | 335/206 |
| 3,359,455 | A | * | 12/1967 | Koda et al. | 315/209 R |
| 3,371,336 | A | | 2/1968 | Bennett | |
| 3,685,041 | A | * | 8/1972 | Kondur, Jr. | 708/130 |

(Continued)

FOREIGN PATENT DOCUMENTS

DE 29 43 197 4/1980

(Continued)

*Primary Examiner* — Mohamad Musleh
(74) *Attorney, Agent, or Firm* — Paul Vincent

(57) ABSTRACT

The invention relates to a switch, in particular a vehicle switch, comprising a switching part which can be coupled to an actuation element, is rotationally mounted about a rotational axis and can adopt defined switch positions. The switching part comprises at least one permanent magnet comprising several south pole and/or north pole sections, and at least two magnetic field sensors which are arranged in a fixed manner in relation to the switching part. The output signals of said sensors, according to the switch position of the contact piece, is dependent upon whether a south or north pole section of the at least one permanent magnet is in the detection range of the respective magnetic field sensor and said output signals form an easy to determine binary switch code in the respective switch position. The invention also relates to an evaluation device for said type of switch, a switch unit comprising said type of switch and an evaluation unit.

16 Claims, 2 Drawing Sheets

U.S. PATENT DOCUMENTS

| | | | |
|---|---|---|---|
| 3,988,710 A * | 10/1976 | Sidor et al. | 338/32 R |
| 4,158,216 A * | 6/1979 | Bigelow | 200/600 |
| 4,199,741 A * | 4/1980 | Serrus Paulet | 335/206 |
| 4,458,226 A * | 7/1984 | Cho | 335/205 |
| 4,779,075 A * | 10/1988 | Zagelein et al. | 340/870.18 |
| 5,691,683 A * | 11/1997 | Allwine, Jr. | 335/306 |
| 5,757,180 A * | 5/1998 | Chou et al. | 324/207.2 |
| 6,064,197 A * | 5/2000 | Lochmann et al. | 324/207.14 |
| 6,556,005 B1 * | 4/2003 | Oomkes | 324/207.2 |
| 7,414,392 B2 * | 8/2008 | Parenti | 324/207.2 |

FOREIGN PATENT DOCUMENTS

| | | |
|---|---|---|
| DE | 44 39 157 | 5/1996 |
| DE | 199 38 888 | 4/2001 |
| DE | 101 26 076 | 12/2002 |
| DE | 102 32 559 | 2/2004 |
| DE | 102 34 925 | 2/2004 |
| DE | 103 50 666 | 10/2004 |
| DE | 103 19 132 | 11/2004 |
| EP | 0 600 780 | 6/1994 |
| EP | 0 717 424 | 6/1996 |
| FR | 1 457 361 | 1/1966 |

* cited by examiner

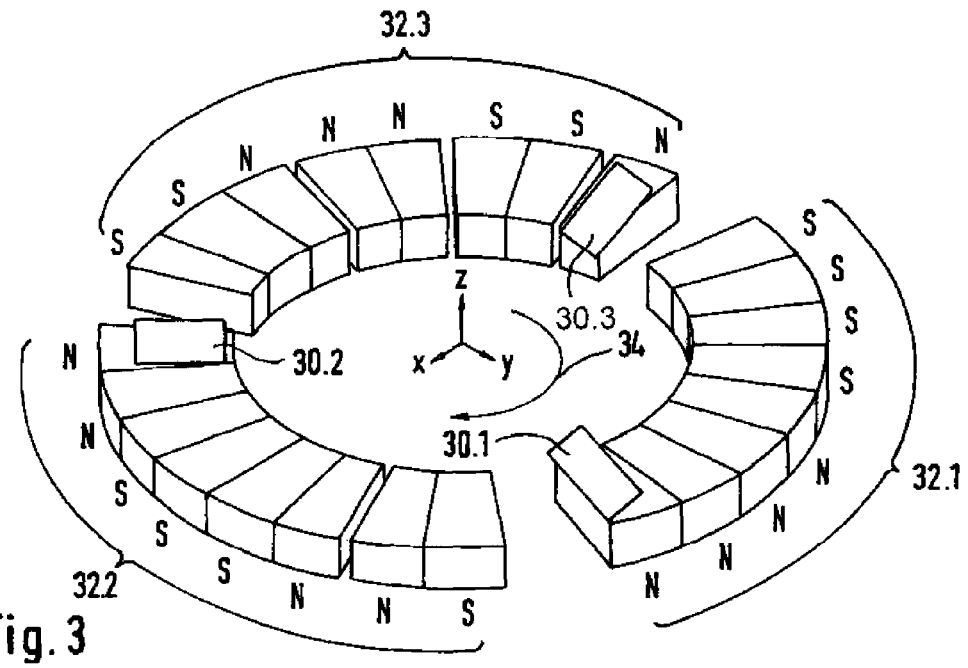
Fig. 3
| ST | 30.1 | 30.2 | 30.3 |
|---|---|---|---|
| 1 | 0 | 0 | 0 |
| 2 | 0 | 0 | 1 |
| 3 | 0 | 1 | 1 |
| 4 | 0 | 1 | 0 |
| 5 | 1 | 1 | 0 |
| 6 | 1 | 0 | 0 |
| 7 | 1 | 0 | 1 |
| 8 | 1 | 1 | 1 |
Fig. 4
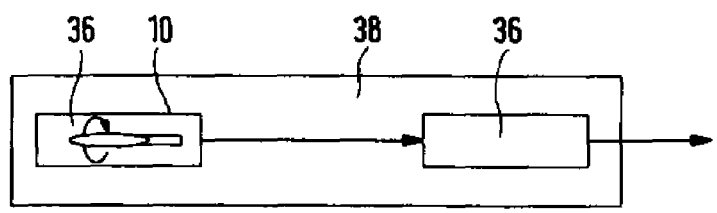
Fig. 5

SWITCH, IN PARTICULAR VEHICLE SWITCH, EVALUATION UNIT THEREFOR AND ASSOCIATED SWITCH UNIT

This application is the national stage of PCT/EP2007/002046 filed on Mar. 9, 2007 and claims Paris convention priority of DE 10 2006 012 890.7 filed Mar. 13, 2006.

BACKGROUND OF THE INVENTION

The invention concerns a switch, in particular, a vehicle switch, that comprises a switching part which can be coupled to an actuation element, is rotationally mounted about a rotational axis and can adopt defined switch positions. The invention also relates to an evaluation device for this type of switch, a switch unit comprising this type of switch and an evaluation unit.

Numerous types of switches, in particular vehicle switches, are known from prior art. The switch signals generated by the switch are usually transmitted and processed in parallel, for which a dedicated signal line is required for each switch position. Wear occurs as electrical contacts are closed or opened in each of the switch positions. Moreover, sufficient actuation forces must be exerted to open or close the contact.

In known switches, it has also proven problematic that the switch signals generated are resistance-coded or voltage-coded for transmission to an evaluation device or in an evaluation device, so that the signals can be processed there.

The object of this invention is to further develop a switch of the kind mentioned above, in particular, a vehicle switch, in such a way that both permanent reliable detection of the switch positions is possible and simple signal transmission to an evaluation device is achieved.

SUMMARY OF THE INVENTION

This object is solved by a switch with the characteristics of claim 1. Such a switch comprises a switching part that is rotationally mounted about a rotational axis and a switching part that can be put into defined, in particular latchable, switch positions, wherein the switching part comprises at least one permanent magnet having several south pole and/or north pole sections. Moreover, at least two magnetic field sensors are provided which are arranged in a fixed manner in relation to the switching part, whose output signals, according to the switch position of the switching part, are dependent upon whether a south or north pole section of at least one permanent magnet is in the detection range of the respective magnetic field sensor. The output signals of the magnetic fields sensors form an easy to determine binary switch code in the respective switch position.

Such a switch has the advantage that, due to the contactless detection of the switch position by the magnetic field sensors, no wear occurs. Moreover, because of the output signals of the magnetic field sensors, which form the binary switch code, this switch code can be made directly available to an evaluation device. Because of the easy to determine switch code, the current switch position of the switching part can be uniquely inferred.

An advantageous embodiment of the invention is characterized in that the at least one permanent magnet is constituted at least partly as a magnet ring or magnet ring section disposed about the rotational axis. If only one permanent magnet is provided, this is preferably disposed on a circular ring. If multiple permanent magnets are used, they can, for example, be disposed on a common circular ring or concentrically adjacent about a common rotational axis. In this case, the magnetic field sensors are advantageously axially adjacent to and/or radially around the permanent magnet or the permanent magnets. By means of such an arrangement, unique assignment of the south or north pole sections to the magnetic field sensors can be achieved, while occupying relatively little installation space.

According to a further preferred embodiment of the invention, the south or north pole sections are contiguously adjacent. This is advantageous, in particular, if the permanent magnet or permanent magnets are constituted as a magnet ring or magnet ring section. This advantageously results in either a south pole or north pole section always being present in the detection ranges of the magnetic field sensors. This enables unique pole detection by the magnetic field sensor as either the north pole or the south pole is detected. The fact that in each switch position of the switching part, either a south pole section or a north pole section is assigned to a magnetic field sensor also ensures sufficient protection against interfering external magnetic fields that could result in a spurious switch code.

According to a further embodiment of the invention, it is conceivable that, in a neutral position of the switching part, there is no south or north pole section in the detection range of the magnetic field sensors. Such a neutral position could, for example, be used as a reference point at which the magnetic field sensors detect a detection gap.

According to a further embodiment of the invention, the south or north pole sections can be disposed such that, on rotation of the switching part from one switch position to an adjacent switch position, the switch code only changes by an output signal of one magnetic field sensor. In this case, the number of magnetic field sensors always corresponds to the number of bits of the switch code. When the switching part switches to an adjacent switch position, only one bit of the switch code therefore changes.

If two magnetic field sensors are provided, the permanent magnet or permanent magnets preferably constitute two circular ring sections each with four pole sections, wherein, with the two magnetic field sensors, no more than four consecutive switch positions can be detected. If three magnetic field sensors are provided, three magnet ring sections are preferably present, each of them having preferably eight pole sections, wherein up to eight switch positions can be detected. The individual magnet ring sections are advantageously disposed one behind the other in one plane.

According to a further embodiment of the invention, the switch can comprise a shaft section, on which the switching part with the at least one permanent magnet is rotationally mounted. This ensures that the switching part can make a reliable transition from one switch position to an adjacent switch position.

It is also conceivable to provide a latching mechanism that holds the switching part in its current switch position by means of a releasable latch. The switching part can adopt defined switch positions because of the latching mechanism. The latching mechanism is preferably disposed on the shaft section and acts against the switching part.

The switching part can be made of plastic, wherein the permanent magnet can then be molded into the switching part or attached thereto. Molding the permanent magnet into the switching part has the advantage that the permanent magnet is permanently reliably protected.

In particular, the permanent magnet or permanent magnets are constituted as plastic-bound magnets that are made of an injection-molded, magnetized plastic composite material. This has the advantage that, in particular, when only one permanent magnet is used, this can be manufactured in the intended mold, for example, by injection molding and can then be fitted by means of the appropriate devices, such as magnetization coils, to the sections provided with the corresponding pole in each case.

As the magnetic field sensors, Hall-effect ICs disposed on a printed circuit board can be used, for example. When e.g. a north pole section enters the detection range of a Hall-effect IC, the latter is switched on: when e.g. a north pole section enters the detection range of the Hall-effect IC, this is reliably switched off again.

The above stated object is also achieved by an evaluation device for an inventive switch, wherein such an evaluation device determines a corresponding switch position from the current switch code of the switch and initiates an associated switching operation. The evaluation device may be disposed directly on the switch or remote from the switch.

The evaluation device advantageously checks the sequence of the switch codes for plausibility and/or redundancy.

The sequence of the switch codes can be stored in the evaluation device, wherein, during the actual switching operation, a comparison is made to see if the actual sequence of the switch codes matches the stored sequence of the switch codes. The direction in which the switching part is being moved can also be checked.

According to the invention, the evaluation device can evaluate the switch code generated directly by the magnetic field sensors. This has the advantage that no intermediate coding and/or intermediate conversion of the signals has to be performed. However, the invention also encompasses that the switch code generated by the magnetic field sensors is converted to a digital signal before evaluation by the evaluation device. This can be done, for example, in an analog-to-digital converter (ADC) and/or by appropriate resistance coding.

The object stated above is also achieved by a switch unit that comprises an inventive switch and an inventive evaluation device.

Further details and advantageous embodiments of the invention are to be found in the following description, which describes and explains the embodiment of the invention shown in the figures more extensively.

BRIEF DESCRIPTION OF THE DRAWING

The illustrations show:

FIG. 3 the permanent magnet shown in FIGS. 1 and 2 in a perspective view with the associated magnetic field sensors;

FIG. 4 a table with the binary switch codes of the magnetic field sensors according to FIG. 3 in various switch positions; and FIG. 5 a schematic representation of an inventive switch unit with a switch and evaluation device.

DESCRIPTION OF THE PREFERRED EMBODIMENT

Figure 1:
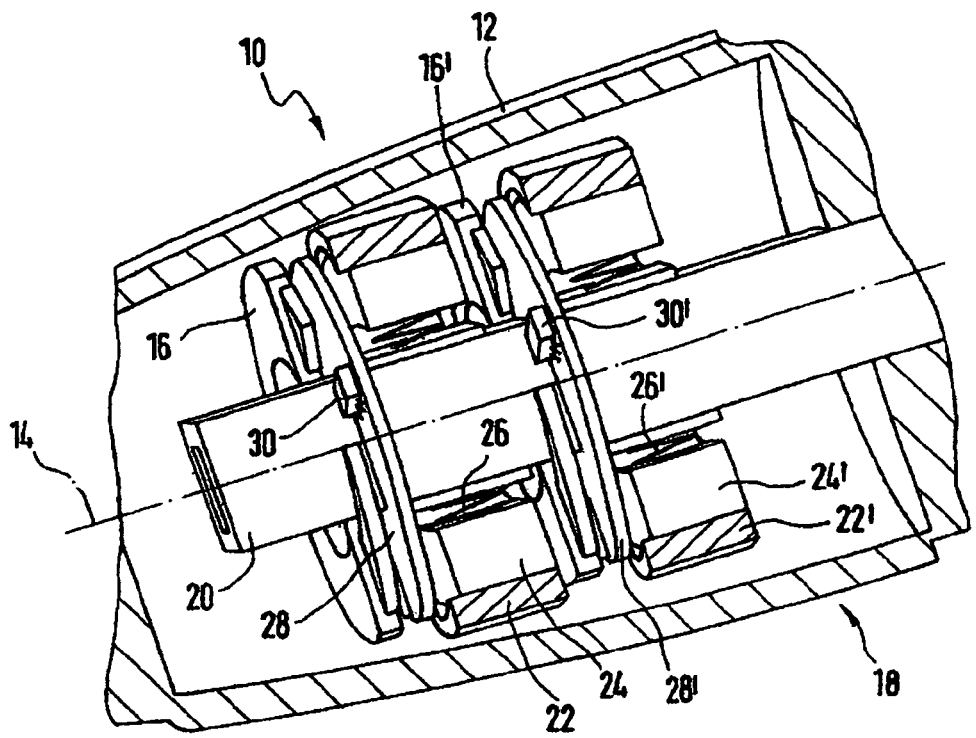
FIG. 1 a longitudinal section through a switch lever of a steering-column switch of a motor vehicle.
Figure 2:
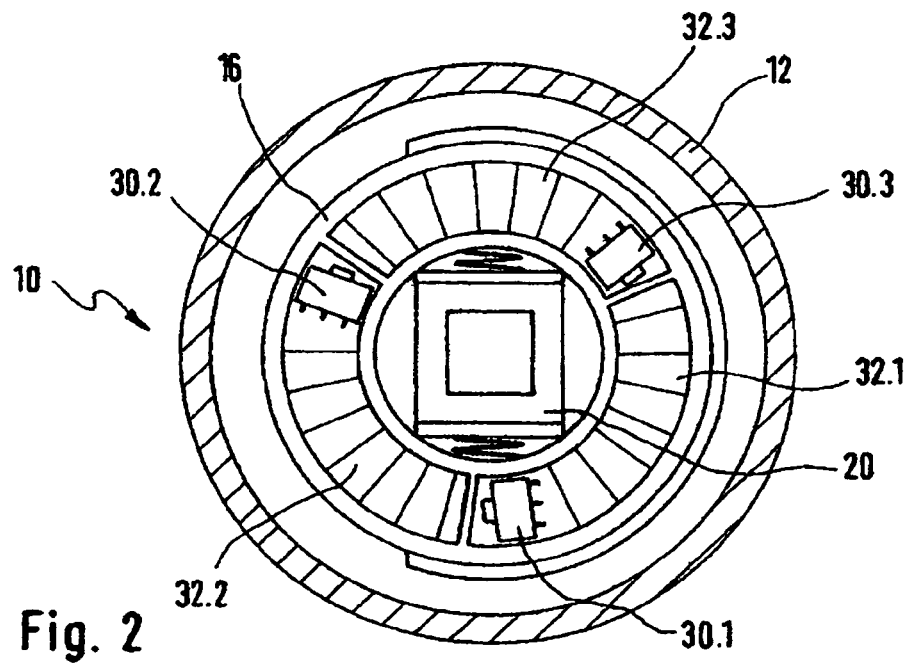
FIG. 2 a cross-section through the switch lever according to FIG. 1.

The rotary switch 10 depicted in FIGS. 1 and 2 is disposed on a switch lever 18 of a steering-column switch of a vehicle. The switch 10 comprises a switching part 16 that is coupled with an actuation element 12, rotationally mounted about a rotational axis 14 and can be put into definable switch positions. The actuation element 12 is constituted as a ring element or rotatable ring cap that can rotate about the rotational axis 14 and is disposed in the region of the free end of the switch lever 18 of which a portion is shown in FIG. 1. In the interior of the switch lever 18, a shaft section 20 is provided about which the actuation element 12 or the switching part 16 is at least conditionally rotationally mounted. In addition and parallel to the switching part 16, a further switching part 16' is provided that can be rotationally coupled with its own actuation element. Further switching parts 16 may also be provided on the shaft section 14.

To keep the switching part 16 or the associated actuation element 12 in predefined switch positions such that it can be released, latching mechanisms are provided that comprise a hollow ring section 22 on the switching part or actuation element to which, at its radially interior side, latching elements 24 are applied by means of spring elements 26 supported on the shaft section 20. In each switch position, latching protuberances can be provided on the inner side of the hollow ring section 22 into which the latching elements can releasably engage.

On the switching parts 16 and 16', axially adjacent annular printed circuit boards 28, 28' are disposed on which three equidistant magnetic field sensors 30 or 30' are disposed. As can be clearly seen from the view according to FIG. 2, the three magnetic field sensors 30 each subtend an angle of approx. 120° relative to the rotational axis 14.

As is clear, in particular from FIGS. 2 and 3, the switching part 16, 16' comprises three permanent magnets 32.1., 32.2 and 32.3 constituted similar to ring sections, disposed in one plane about the rotational axis 14. Instead of three single permanent magnets, it is possible according to the invention for only one annular, closed permanent magnet to be used. One magnetic field sensor 30.1., 30.2 and 30.3 is assigned to each magnet ring section 32.1., 32.2, and 32.3. Depending on the switch position of the switching part 16, the output signals of the magnetic field sensors are determined by whether a south pole or north pole section of each magnet ring section is in the detection range of the corresponding magnetic field sensor. The output signals of the three magnetic field sensors form an easy to determine binary switch code in each switch position.

FIG. 3 shows the three magnet ring sections 32.1, 32.2 and 32.3 each with their north pole sections N and south pole sections S. The associated magnetic field sensors 30.1, 30.2 and 30.3 are also shown. Each magnet ring section has a total of eight pole sections that are contiguously adjacent. In the switch position STI shown in FIG. 3, a north pole N is in the detection ranges of each of the three magnetic field sensors 30.1, 30.2 and 30.3. By rotating the switching part 16 or the three magnet ring sections in the direction of the arrow 34, the switch can be put in the further switch positions ST2 to ST8.

The magnet ring sections 32.1, 32.2 and 32.3 are plastic-bound magnets that are embedded or cast in the switching part 14 made of plastic. To manufacture the magnet ring sections 32.1, 32.2 and 32.3, magnetizable compound is injected into the appropriate molds. This compound can then be magnetized with a suitable magnetization device on each section with a north or south pole. The south pole sections S and north pole sections N shown in FIG. 3 are only present on the side of the permanent magnet facing the magnetic field sensors 32.1, 32.2 and 32.3; the corresponding bipoles with opposite polarity are located on the side facing away from the magnetic field sensors 32.1, 32.2 and 32.3. The bipoles of the north pole and south pole sections shown in FIG. 3 are not shown in FIG. 3.

The table for FIG. 3 given in FIG. 4 states that, in the switch position STI, the three magnetic field sensors 30.1., 30.2 and 30.3 have the value 0 as their output signals because of the north pole sections in the detection ranges N. The associated switch code in this switch position STI is therefore 000. If the switching part 16 according to FIG. 3 is now moved in the direction of arrow 34 into the second switch position ST2 adjacent to the switch position STI, the binary switch code at magnetic field sensor 30.3 moves by one bit; a south pole section S now enters the detection range of magnetic field sensor 30.3. This results in the binary switch code 001 in switch position ST2. In switch position ST3, the switch code now changes by a further bit in the detection range of the magnetic field sensor 30.2; the switch code is then 011. As can be seen from the table of FIG. 4, because of the selected arrangement of the north pole and south pole sections on further rotation of the switching part from one switch position into an adjacent switch position, the switch code only changes by an output signal of one magnetic field sensor, in other words, one bit. If three magnetic field sensors are provided, up to eight different switch positions ST1 to ST8 can be uniquely detected.

As shown in FIG. 5, an evaluation device 36 is used for evaluation of the switch code generated by the switch 10 and determines the current switch position from the output signals of the three magnetic field sensors or from the corresponding switch codes to initiate associated switching operations. The evaluation device 36 can check the sequence of the switch code for plausibility. It is also advantageous if the sequence of the switch codes is stored in the evaluation device 36. Especially if, as in FIGS. 3 and 4, the switch code changes by only one bit between two adjacent switch positions, it is simple to check the switch operation. The switch signals generated by the magnetic field sensors can be directly provided to the evaluation device 36 or converted to digital signals by appropriate converters. The switch 10 and the corresponding evaluation device 36 are parts of switch unit 38. The evaluation device 36 can, for example, be disposed on the printed circuit board on which the magnetic field sensors are disposed, or remote from this.

We claim:

1. A steering-column switch comprising: a steering-column switch lever housing, said switch lever housing having a hollow, rotatable actuation element;
    a switching part completely disposed within said steering-column switch lever housing, said switching part structured for cooperation with said actuation element, said switching part rotationally mounted about a rotational axis to adopt defined switch positions, said switching part having at least one permanent magnet with several south pole sections and several north pole sections, wherein said at least one permanent magnet is at least partly structured as a magnet ring mounted about said rotational axis, said magnet ring consisting essentially of at least two annular ring segments, wherein each annular ring segment is separated from a neighboring annular ring segment by a gap, said gap thereby constituting a neutral position of said switching part having no south or north pole section of said permanent magnet present in detection ranges of said magnetic field sensors;
    a transmission element connected between said switching part and said actuation element for inducing rotation of said switching part when said actuation element is rotated; and
    at least two magnetic field sensors disposed in a fixed manner relative to said switching part and completely within said switch lever housing, each magnetic field sensor being associated with one ring segment,
    said magnetic field sensors having output signals which depend upon whether one of said south pole sections or whether one of said north pole sections of said at least one permanent magnet is in a detection range of a respective one of said at least two magnetic field sensors in accordance with a switch position of said switching part, wherein said output signals thereby define a clearly discernable binary switch code for each switch position.

2. The switch of claim 1, wherein south pole and/or north pole sections of said at least one permanent magnet are contiguously adjacent.

3. The switch of claim 1, wherein no south pole or north pole section of said permanent magnet is present in detection ranges of said magnetic field sensors in a neutral position of said switching part.

4. The switch of claim 1, wherein said south pole and said north pole sections are disposed such that, upon rotation of said switching part from one switch position to an adjacent switch position, said switch code only changes by an output signal of one magnetic field sensor.

5. The switch of claim 1, wherein the switch comprises two magnetic field sensors and up to four switch positions.

6. The switch of claim 1, wherein the switch comprises three magnetic field sensors and up to eight switch positions.

7. The switch of claim 1, wherein the switch comprises a shaft section on which said switching part is rotationally mounted.

8. The switch of claim 1, wherein latching mechanisms are provided to hold said switching part in a current switch position.

9. The switch of claim 1, wherein said switching part is made from plastic.

10. The switch of claim 1, wherein said permanent magnet is plastic-bound and molded into or attached to said switching part.

11. The switch of claim 1, wherein said magnetic field sensors are Hall-effect ICs disposed on a printed circuit board.

12. An evaluation device for the switch of claim 1, the evaluation device determining a corresponding switch position from a current switch code to initiate an associated switching operation.

13. The evaluation device of claim 12, wherein the device checks a sequence of the switch codes for at least one of plausibility and redundancy.

14. The evaluation device of claim 12, wherein the evaluation device evaluates the switch code directly generated by said magnetic field sensors.

15. The evaluation device of claim 12, wherein the switch code generated by said magnetic field sensors is converted to a digital signal prior to evaluation in the evaluation device.

16. A switch unit comprising the switch of claim 1, the switch unit having an evaluation device to determine a corresponding switch position from a current switch code to initiate an associated switching operation.

* * * * *